Dec. 16, 1924.
F. W. BURCH
TIRE RACK
Filed Feb. 11, 1922
1,519,720
3 Sheets-Sheet 1
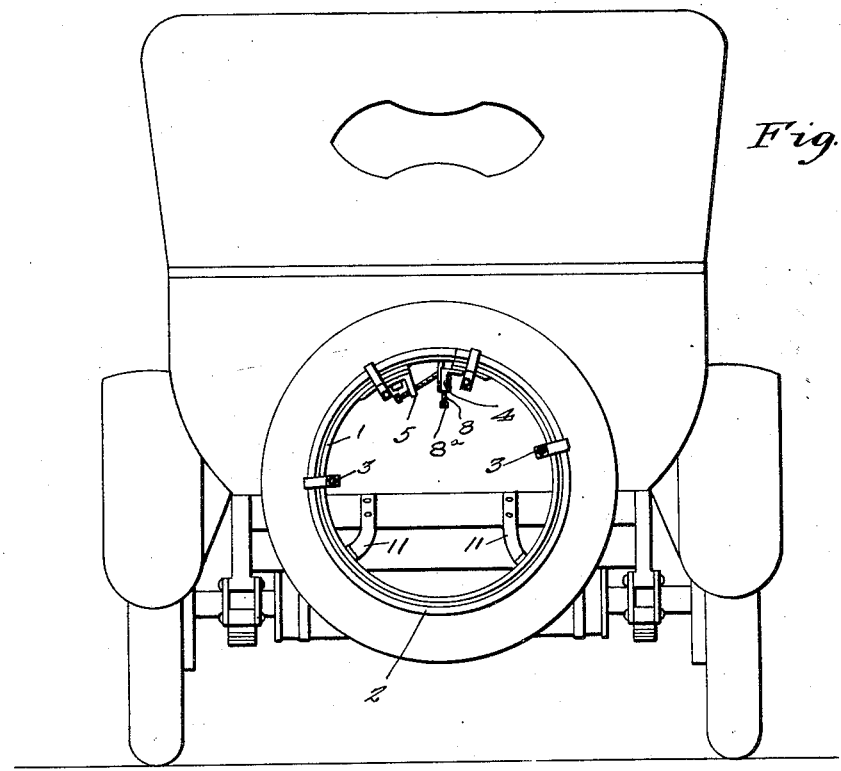
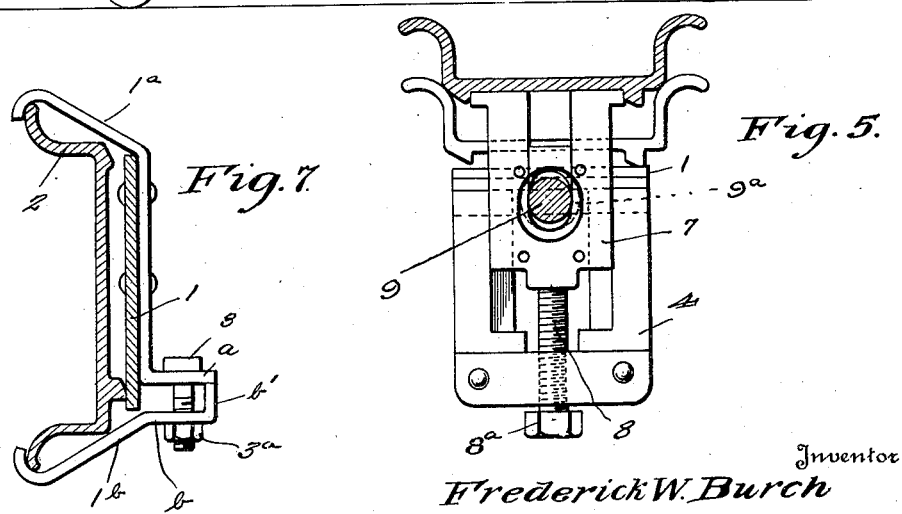
Witness
K. A. Thomas
Inventor
Frederick W. Burch
By Lyman Middleton Donaldson & Hull
Attorney Dec. 16, 1924. 1,519,720
F. W. BURCH
TIRE RACK
Filed Feb. 11, 1922 3 Sheets-Sheet 2
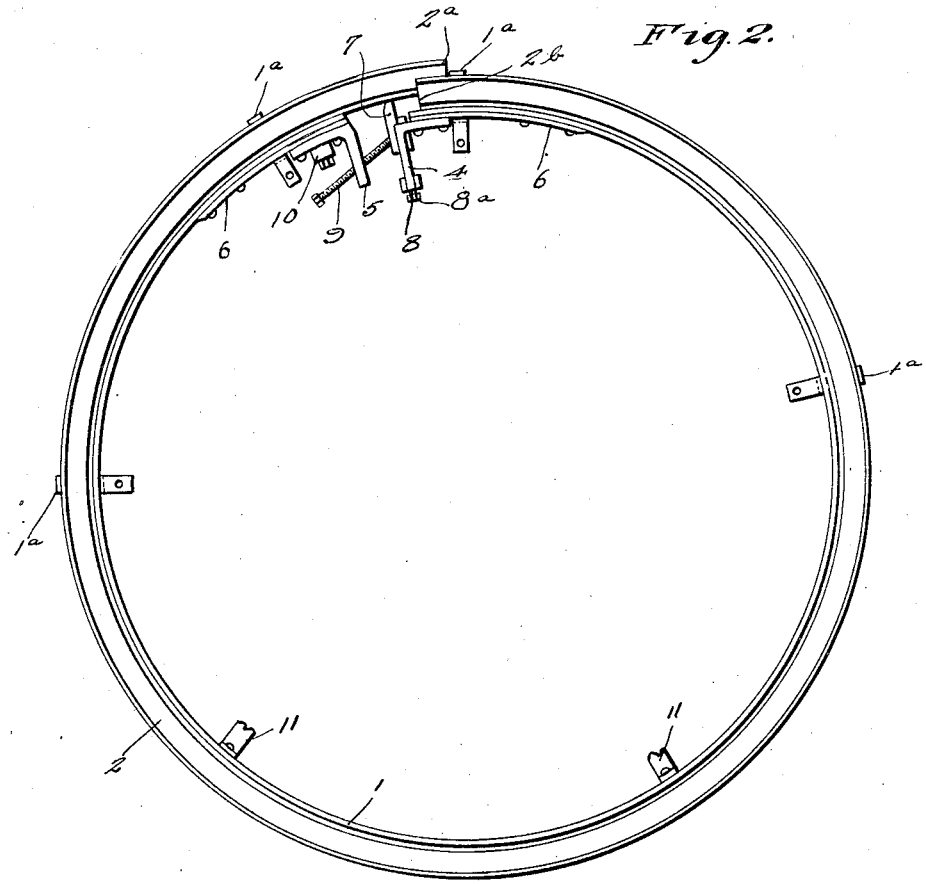
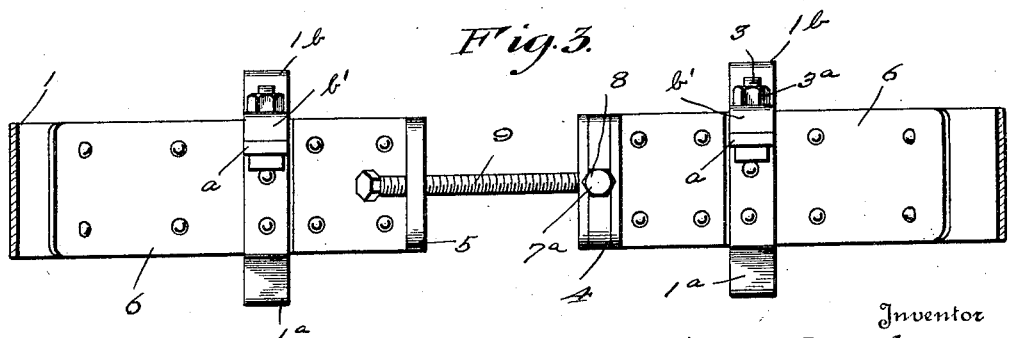
Inventor
Frederick W. Burch Dec. 16, 1924.
F. W. BURCH
TIRE RACK
Filed Feb. 11, 1922
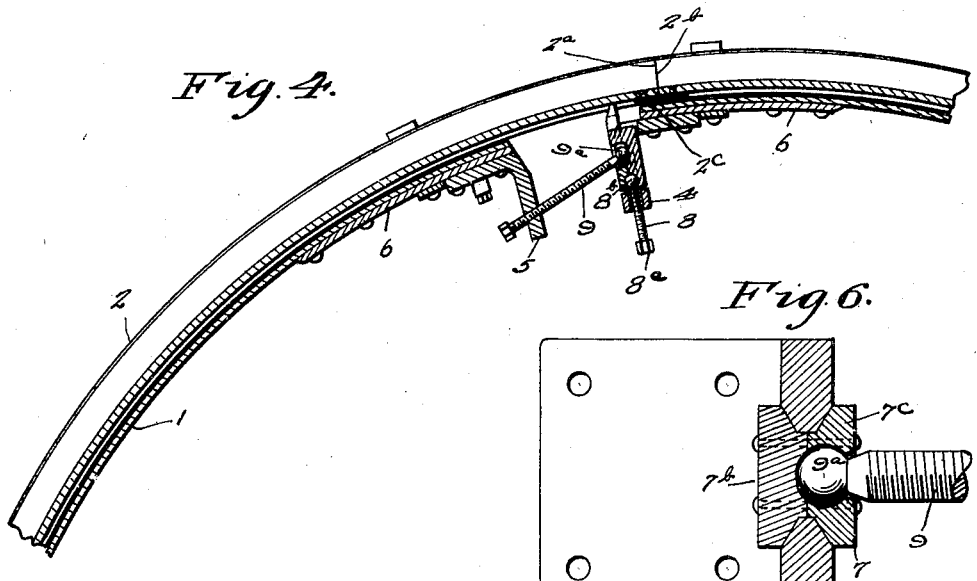
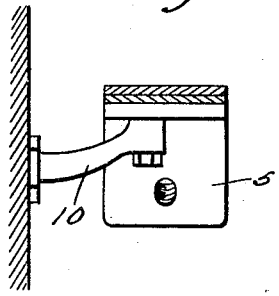
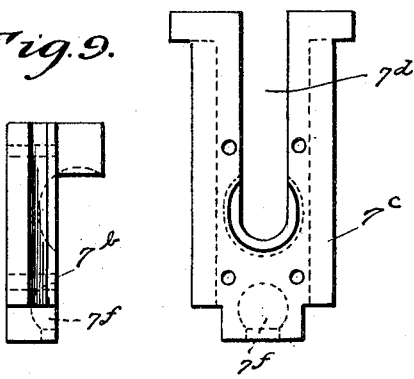
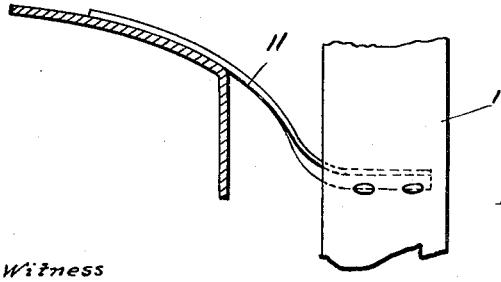
Frederick W. Burch, Inventor Patented Dec. 16, 1924.

1,519,720

UNITED STATES PATENT OFFICE.

FREDERICK W. BURCH, OF PUEBLO, COLORADO.

TIRE RACK.

Application filed February 11, 1922. Serial No. 535,875.

*To all whom it may concern:*

Be it known that I, FREDERICK W. BURCH, a citizen of the United States, and resident of Pueblo, county of Pueblo, and State of Colorado, have invented certain new and useful Improvements in Tire Racks, of which the following is a specification.

My present invention relates to improvements in devices for carrying and manipulating the spare rims of motor cars.

One object of the invention is to provide a device which will serve as a carrier for removably supporting a spare rim and which may be easily manipulated to break the interlocking joint with which such rims are usually provided, and to contract the rim to enable the tire to be readily removed therefrom.

A further object is to provide a device which will be of simple and durable construction and which will not be materially heavier than the ordinary spare tire carrier.

Another object is to provide a device which may be operated by the usual spare rim wrench.

A still further object is to provide a construction in which ample power will be available to spread and contract the rim with a minimum amount of effort, thus enabling the apparatus to be readily operated by people lacking the strength necessary to manipulate the rims in the manner heretofore customary.

With these and other objects in view the invention includes the novel features of construction and arrangement and combination of parts hereinafter described, the nature and scope of my invention being defined by the claims appended hereto.

An embodiment of my invention is illustrated in the accompanying drawings in which,—

Figure 1 is a rear elevation of a motor car with my improved rack applied thereto.

Fig. 2 is an enlarged view of the rack detached with the rim carried thereby, the parts being shown in rim contracted position.

Fig. 3 is a plan view of the operating mechanism viewed from the inside of the carrying ring.

Fig. 4 is a partial longitudinal view.

Fig. 5 is a transverse section taken just to the left of the slide member, Fig. 1, looking towards the right.

Fig. 6 is a sectional detail of the slide and its connection to screw 9.

Fig. 7 is a transverse section through the carrying ring and rim adjacent the holding clips.

Figs. 8 and 9 are detail views of the slide member, and

Figs. 10 and 11 are detail views of rim carrying brackets.

Referring by reference characters to these drawings the numeral 1 designates the tire carrier proper which is in the form of a split ring having its ends separated sufficiently to permit their being moved towards and from each other sufficiently for the expanding and contracting of the rim in the manner hereinafter described.

This ring may be secured to the motor vehicle in any desired position and manner, for example, to the back of the car (shown conventionally) by bracket arms having sufficient resiliency to permit the expanding and contracting of the ring.

Said ring is shaped upon its outer face to form a seat for the tire carrying rim which is indicated at 2, a plain outer face as shown serving this purpose, and is provided with means for detachably holding the rim thereon. Such means I preferably make in the form of clips or hook members $1^a$ and $1^b$ (Fig. 7), the former being permanently secured to the ring in any suitable manner as by riveting or welding and being adapted to hook over or engage one flange of the rim, while the clips $1^b$ are adapted to hook over or engage the other flange of the rim. The clips $1^b$ are made removable, preferably by having base portions $b$ which are detachably secured to inwardly extending lugs or parts $a$ of the clips or members $1^a$, and such detachable securing means preferably comprises bolts 3 passing through aligning openings in the juxtaposed parts and having nuts $3^a$ which are of a size to fit the customary wrench used for manipulating the nuts which cooperate with the usual rim lugs. Preferably the base portions of the clips $1^b$ are provided with angularly turned ends $b'$ which engage the ends of the portions $a$, thus providing a lever action as the nuts are tightened.

By removing the nuts 3ª and clips 1ᵇ the rim and tire carried thereby may be readily removed from the carrier and the rim carrying the deflated tire substituted therefor.

To enable the carrier to be used for contracting the rim whereby the tire may be readily removed for repair and replaced without removal of the rim from the carrier I provide the following described means.

Secured to the adjacent ends of the ring 1 are a pair of inwardly extending members 4 and 5 (Figs. 1 to 3) preferably of substantially L shape (reversed in position) and having their bases secured to the ends of the ring in any suitable manner, as by welding or riveting. In practice I prefer to reinforce the ends of the ring by reinforcing strips 6 as this enables me to use a lighter ring. Member 5 is set back a material distance from the split to leave what I term a free rim portion.

The member 4 is projected or located slightly beyond the corresponding end of the ring and is provided with an open center of rectangular form, (Fig. 5) the walls of which form a guide for a member 7 which is slidable radially of the ring and can be operated by a screw 8 threaded through the top of the member 4 and having its end provided with swivel connection with the slidable member 7, the inner end of the screw having a non-circular head 8ª designed to fit the tire wrench hereinbefore referred to. The outer end of the slide is adapted to slidingly contact with the inner face of the free rim portion above referred to.

A screw bolt 9 having a head fitted to receive the aforesaid wrench is threaded through the other member 5 and has its end swiveled to said slidable member 7, the screw preferably being located in inclined position as shown.

It will be understood that the rims used in many if not most of the motor cars using pneumatic tires are split rims having the abutting ends 2ª and 2ᵇ provided with interlocking connections as indicated at 2ᶜ, and that to remove a tire it is first necessary to spread or expand the rim to separate the ends sufficiently to clear said interlocking connections, to thereafter deflect one of the ends out of alignment with the other end, and to then contract the rim sufficiently to permit ready removal of the tire. This, due to the stiffness of the rim owing to its size and flanged construction, is ordinarily a difficult operation, requiring material strength and the use of elaborate tools. With my improved device this is extremely simple and easy as it is only necessary first to operate screw bolt 9 in the proper direction by the tire wrench to expand the rim to disengage or clear the interlocking connections; to thereafter operate screw 8 in a similar manner and in the proper direction to move the slidable member 7 outwardly relatively to its carrying bracket.

As soon as the end of the slide contacts with the free portion of the rim, continued movement of the slide will displace the ends radially.

In the embodiment shown, due to the fact that the member 5 is rigidly supported from the car body, it is the guide which actually has the bulk of movement, the guide or bracket 4 moving relatively to the slide after the latter has abutted against the free rim portion and carrying the corresponding portion 2ᵇ of the rim out of alignment with the portion 2ª. By supporting the ring in such a manner that the guide or bracket 4 has the bulk of the movement, rather than the slide, I can have the screw 9 supported in a plain threaded opening in the lug 5, or in other words, do not have to provide for any pivoted movement of bolt or screw 9, but it is obvious that it is immaterial which end of the rim is actually moved or whether both are, so long as there is a relative displacement.

The rim ends having thus been carried out of alignment, the operation of the screw bolt 9 in the reverse direction will draw the lug members 4 and 5 towards each other, contracting the rim (see Fig. 2), which may be done to such an extent that the tire may be slipped off without appreciable effort. During this movement the end of the slide moves along the inner face of the free portion of the rim, being guided by the channel on the inner face thereof, as shown in Fig. 5. After the tire has been repaired and replaced, the reverse operation of the bolts restores the rim to tire holding position, and the tire and rim are then carried as a spare ready for removal to replace a deflated tire.

While I have described my device as embodied in a spare tire carrier, it is obvious that it may be used as a part of a shop equipment by being mounted on any suitable stand or support.

It will also be obvious that my device could be used as a tool by simply omitting the ring and clamping the reinforcing plates carrying the L shaped members directly to the corresponding portions of the split rim.

I have hereinbefore referred to the screw 9 being located in inclined position, this being preferred because on operating the screw to expand the rim it tends to hold the outer end of the slide pressed into the channel in the under face of the rim.

It is obvious that any approved type of means for supporting the rim may be used, provided it is such as to not interfere with or prevent the relative movement of the ends of the ring. For example, I may use a rigid bracket 10 carried by the car body and connected to bracket 5 and a couple of brackets 11 supporting the lower portion of the ring, one or both of which may be made to yield sufficiently to permit the necessary movement of the ring in expanding and contracting, though as a matter of fact only the right hand bracket, Fig. 1, need be resilient and this only moderately so, as a very slight movement is sufficient.

While any suitable form of slide and bolt connection may be used, I prefer the construction shown in detail in Figs. 6 to 9, in which the slide is formed of two members 7ª and 7ᵇ suitably secured together and having an interior socket to receive the spherical head 9ª of the bolt 9, and having also exterior grooves to fit the guide walls of the member 4. The member 7ᶜ is preferably of bifurcated form and member 7ᵇ has a lateral projection 7ᵉ which fits in the bifurcation (7ᵈ) and has a recessed face (dotted lines Fig. 9) forming part of the ball socket. Said slide sections also have co-operating ball socket portions 7ᶠ which hold the ball 8ᵇ of the screw 8.

Having thus described my invention what I claim is,—

1. A tire rim rack comprising a split carrying ring, means for securing a tire rim thereon with the split in the ring adjacent the split in the rim, means carried by the ends of said ring for moving one of the ring ends radially out of alignment with the other, and other means associated with said first named means for moving one of said ring ends circumferentially relative to the other.

2. A tire rim rack comprising a split ring, means for securing a split tire rim thereon with the split in the rim adjacent the split in the ring, lug members carried by the ends of said split ring, a radially movable member carried by one of said lug members having a portion adapted to contact with one of the rim ends, and means for forcing said lugs towards and from each other.

3. A tire rim rack comprising a split ring having separated ends, means for securing a split rim thereon with the split adjacent one of said ends, a radially movable member carried by said end and adapted to bear on a portion of the rim beyond said split, means for moving the ends of the ring towards and from each other, and means for operating said radially movable member.

4. A tire rim rack comprising a split ring having separated ends, means for securing a rim to said ring with its split adjacent one of said ends, and a free rim portion extending beyond the other end, a radial guide carried by said first named end, a slide member carried by said guide having a part to bear against said free rim portion, means for expanding and contracting said free rim portion, and means for operating said slide member.

5. A tire rim rack comprising means for removably supporting a split rim, radially acting screw means for initially displacing said rim ends radially relative to each other, and screw means acting substantially circumferentially of the rim for displacing said ends circumferentially.

6. A tire rim rack including a pair of members, means for clamping one of said members to a split rim adjacent the split, means for clamping the other member to the rim at a material distance from the split to leave a free rim portion, means for moving one of said members towards and from the other, and means carried by the first named member and slidably contacting with said free rim portion for moving said rim ends out of alignment.

7. A tire rim rack including a pair of members, means for clamping one of said members to a split rim adjacent the split, means for clamping the other member to the rim at a material distance from the split to leave a free rim portion, a slide carried by the first member, and having a part for contact with said free portion of the rim, means for imparting movement to the slide, and means for moving said members towards and from each other.

8. A tire rim rack including a pair of members, means for clamping one of said members to a split rim adjacent the split, means for clamping the other member to the rim at a material distance from the split to leave a free rim portion, a slide carried by the first named member having a part for contact with said free portion of the rim, a screw carried by said member for operating said slide, and means for moving said members towards and from each other.

9. A tire rim rack including a pair of members, means for clamping one of said members to one end of a split rim adjacent the split, means for clamping the other member to the other end of the rim relatively remote from the split to leave a free rim portion, means carried by said first named member adapted to slidably bear on the end of said free rim portion to displace the rim ends radially, and means for moving said members towards and from each other.

10. A tire rim rack including a pair of members, means for clamping one of said members to one end of a split rim adjacent the split, means for clamping the other member to the other end relatively remote from the split to leave a free rim end, a radially movable device carried by said first named member and slidably engaging the inner face of the said free end of the rim, means for actuating said slide, and means for moving said members towards and from each other.

11. A tire rim rack including a pair of members, means for clamping one of said members to one end of a split rim adjacent the split, means for clamping the other member to the other end relatively remote from the split to leave a free rim end, a radially movable device carried by said first named member and slidably engaging the inner face of the said free end of the rim, means for actuating said device, and a screw threaded through said second member and having its end provided with a swivel connection with said device.

In testimony whereof, I affix my signature.

FREDERICK W. BURCH.